US012603267B2

(12) United States Patent
Hess et al.

(10) Patent No.: US 12,603,267 B2
(45) Date of Patent: Apr. 14, 2026

(54) ENERGY CONVERTER SYSTEM, METHOD OF FABRICATION, AND METHOD OF OPERATION

(71) Applicant: Spark Thermionics, Inc., Berkeley, CA (US)

(72) Inventors: Lucas Heinrich Hess, Berkeley, CA (US); Felix T. Schmitt, Berkeley, CA (US); Jared William Schwede, Berkeley, CA (US)

(73) Assignee: Spark Thermionics, Inc., Berkeley, CA (US)

( * ) Notice: Subject to any disclaimer, the term of this patent is extended or adjusted under 35 U.S.C. 154(b) by 11 days.

(21) Appl. No.: 19/217,723

(22) Filed: May 23, 2025

(65) Prior Publication Data

US 2026/0058110 A1 Feb. 26, 2026

Related U.S. Application Data

(60) Provisional application No. 63/775,825, filed on Mar. 21, 2025, provisional application No. 63/651,095, filed on May 23, 2024.

(51) Int. Cl.

| | |
|---|---|
| ***H01J 45/00*** | (2006.01) |
| ***H01J 9/26*** | (2006.01) |
| ***H02N 3/00*** | (2006.01) |

(52) U.S. Cl.

CPC ................ *H01J 45/00* (2013.01); *H01J 9/26* (2013.01)

(58) Field of Classification Search

CPC ............... H02N 3/00; H01J 45/00; H01J 9/26

USPC ........................................................ 310/306

See application file for complete search history.

(56) References Cited

U.S. PATENT DOCUMENTS

| | | | | |
|---|---|---|---|---|
| 2,727,167 | A | 12/1955 | Daniel | |
| 3,843,896 | A * | 10/1974 | Rason | G21H 1/106 976/DIG. 417 |
| 5,028,835 | A * | 7/1991 | Fitzpatrick | H01J 45/00 313/45 |
| 6,922,455 | B2 | 7/2005 | Jurczyk et al. | |
| 2003/0152186 | A1 | 8/2003 | Jurczyk et al. | |
| 2020/0144039 | A1 * | 5/2020 | Schmitt | H01J 45/00 |

FOREIGN PATENT DOCUMENTS

| | | | | |
|---|---|---|---|---|
| WO | WO-2015173708 A1 * | 11/2015 | | H01J 45/00 |

OTHER PUBLICATIONS

"Alumina Ceramic, Fired or Sintered Ceramic Formed Parts, ADO-85, ADO-90, ADO-96, APO-94, APOLX-94, ADOS-90-R", Coors Tek Safety Data Sheet, date of issue May 15, 2014.

(Continued)

*Primary Examiner* — Jose A Gonzalez Quinones

(74) *Attorney, Agent, or Firm* — Jeffrey Schox; Samuel Rosenthal

(57) ABSTRACT

An energy converter system, preferably including one or more thermionic energy converters and optionally including an electrical power converter. A method of fabrication for an energy converter system, preferably including placing braze material, heating the system, and cooling the system. A method of operation for an energy converter system, preferably including providing a heat source, converting thermal energy to electrical energy, and providing one or more electrical energy outputs.

20 Claims, 3 Drawing Sheets

(56) References Cited

OTHER PUBLICATIONS

Bakken, et al., "Biaxial strength and slow crack growth in porous alumina with silica sintering aid", Journal of the European Ceramic Society, Sep. 5, 2017.
Campbell, et al., "Progress Toward High Power Output in Thermionic Energy Converters", Adv. Sci. 2021, 8, 2003812.
Clémet, et al., "Cesium Consumption in Thermionic Converters", pp. 321-330, 1969.
Kohl, et al., "Chapter 12—Gas Dehydration and Purification by Adsorption", Gas Purification (Fifth Edition) 1997, pp. 1022-1135.
Paponetti, C.A., "Basics of Brazing", AWS Brazing Handbook, 2007.
Rasor, Neds. , "Thermionic Energy Conversion Plasmas", IEEE Transactions on Plasma Science, vol. 19, No. 6, Dec. 1991.
Schwede, et al., "Energy Converter System and Method of Operation", U.S. Appl. No. 19/217,773, filed May 23, 2025.
Schwede, et al., "Energy Converter System and Method of Operation", U.S. Appl. No. 19/217,863, filed May 23, 2025.
Xue, et al., "Low-Temperature Sintering of Alumina with Liquid-Forming Additives", J. Am. Cerom. Soc., Aug. 2011, vol. 74, Issue 8 (1991).
Yates, et al., "Cesium Sorption in Materials for Thermionic Converters", Gulf General Atomic Incorporated, AEC Research and Development Report, GA-8574, C-93b, Advanced Concepts for Future Application—Conversion Devices M-3679 (56 Ed.), prepared under contract AT (04-3)-167, Apr. 8, 1968.

* cited by examiner

ENERGY CONVERTER SYSTEM, METHOD OF FABRICATION, AND METHOD OF OPERATION

CROSS-REFERENCE TO RELATED APPLICATIONS

This application claims the benefit of U.S. Provisional Application No. 63/651,095, filed 23 May 2024, and of U.S. Provisional Application No. 63/775,825, filed 21 Mar. 2025, each of which is herein incorporated in its entirety by this reference.

STATEMENT OF GOVERNMENT SUPPORT

This invention was made with government support under Contract No. 80NSSC22CA069 awarded by the National Aeronautics and Space Administration. The government has certain rights in the invention.

TECHNICAL FIELD

This invention relates generally to the energy converter field, and more specifically to a new and useful energy converter system and method of operation.

DETAILED DESCRIPTION OF THE INVENTION

The following description of the preferred embodiments of the invention is not intended to limit the invention to these preferred embodiments, but rather to enable any person skilled in the art to make and use this invention.

1. Overview

Figure 1:
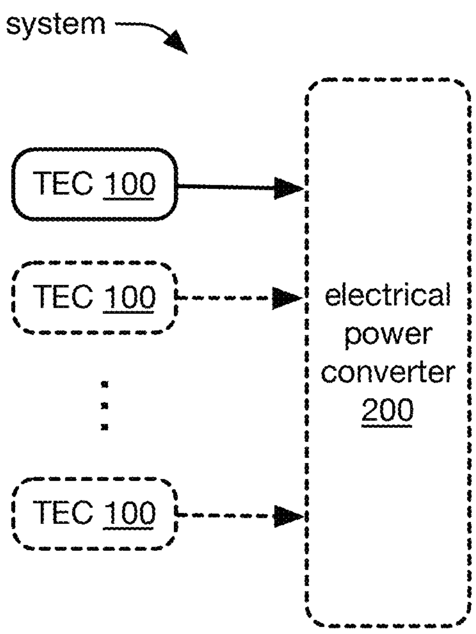
FIG. 1 is a schematic representation of an embodiment of an energy converter system.

An energy converter system preferably includes one or more thermionic energy converters (TECs) 100, and can optionally include an electrical power converter 200 (e.g., as shown in FIG. 1). The TECs preferably function to convert thermal energy to electrical energy. The electrical power converter 200 can function to operate the TECs at or near their optimal power point and/or convert generated electrical power to a desired (e.g., constant voltage) output. However, the system can additionally or alternatively include any other suitable elements and/or be configured in any other suitable manner.

A method of fabrication for an energy converter system preferably includes placing braze material, heating the system, and cooling the system. The method of fabrication is preferably performed to fabricate the energy converter system described herein, but can additionally or alternatively be performed to fabricate any other suitable system(s). In some embodiments, performing the method of fabrication (e.g., to fabricate an energy converter system) can be followed by performing the method of operation (e.g., to operate the energy converter system fabricated by performing the method of fabrication) any suitable number of times.

Figure 2:
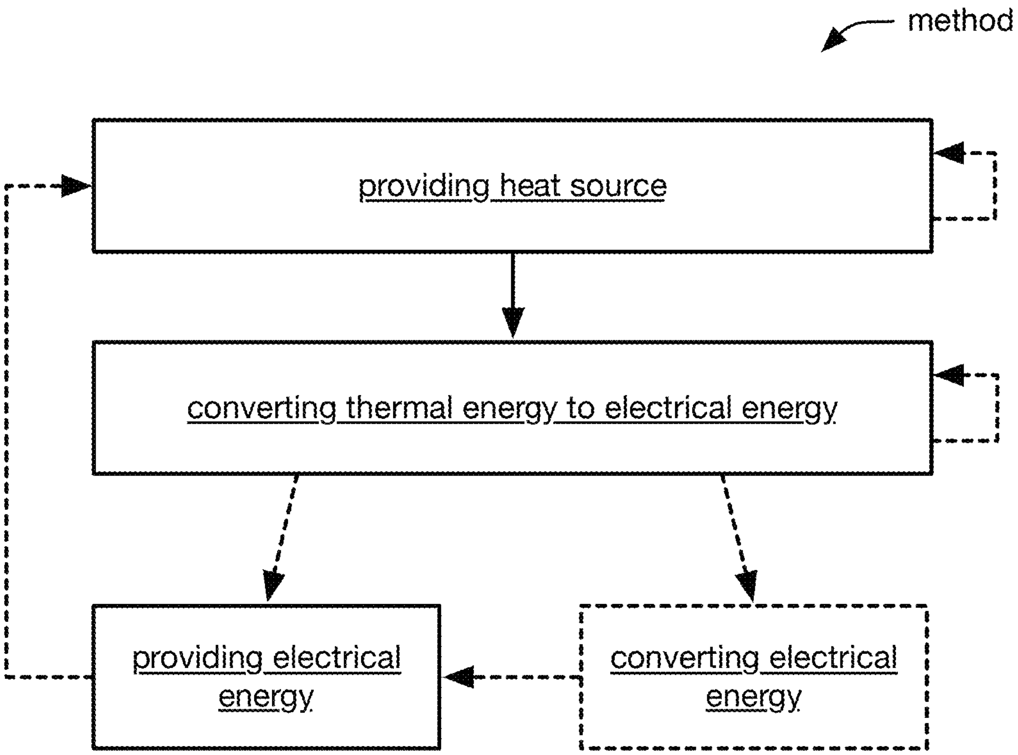
FIG. 2 is a schematic representation of an embodiment of a method of operation for an energy converter system.

A method of operation for an energy converter system (e.g., as shown in FIG. 2) preferably includes: providing a heat source (e.g., to an emitter of one or more TECs), such as a waste heat source (e.g., hot airstream surrounding a vehicle, such as heated due to vehicle velocity, combustion, etc.; heat around and/or within a vehicle, such as heat around and/or within a vehicle engine and/or heat generated by the vehicle engine; heat generated by any suitable equipment, such as heat around and/or within the equipment; heat of combustion; etc.) but additionally or alternatively a dedicated heat source (e.g., combustion heat source such as a burner configured to heat the TEC(s), preferably a high-temperature recuperative burner but additionally or alternatively any other suitable combustion heat source); converting thermal energy to electrical energy (e.g., at the TECs, via thermionic emission); and/or providing one or more electrical energy outputs. The method can optionally include converting the electrical energy (e.g., at one or more electrical power converters), such as converting electrical energy provided by one or more TECs to a desired output characteristic (e.g., constant or substantially constant output voltage). However, the method can additionally or alternatively include any other suitable elements performed in any suitable manner.

The method of operation is preferably performed using the energy converter system described herein, but can additionally or alternatively be performed using any other suitable system(s). The energy converter system is preferably operable and/or configured to perform the method of operation described herein, but can additionally or alternatively have any other suitable functionality.

2. System 2.1 Thermionic Energy Converter.

Each thermionic energy converter (TEC) 100 preferably functions to receive heat and convert the heat to an electrical power output.

Each TEC of the system is preferably a hot shell TEC including a heated emitter body surrounding (e.g., partially surrounding) a collector body. However, the system can additionally or alternatively include one or more button style TECs, inverted design TECs (e.g., as described in U.S. patent application Ser. No. 17/866,381, filed 15 Jul. 2022 and titled "SYSTEM AND METHOD FOR THERMIONIC ENERGY GENERATION", which is herein incorporated in its entirety by this reference, such as described therein regarding the TEC), and/or TECs having any other suitable designs.

The TECs can include plasma-based TECs (e.g., wherein during operation, the vacuum gap between the TEC emitter and collector has an ignited plasma, such as a cesium plasma, which can, in some examples, function to reduce space charge effects associated with the thermionic current traversing the vacuum gap; in examples, this can additionally or alternatively include ionization-based TECs, such as surface ionization or Knudsen TECs, etc.), micro-gap TECs (e.g., wherein the distance between the TEC emitter and collector through vacuum gap is less than a threshold distance, such as less than 100 μm, less than 30 μm, less than 10 μm, less than 3 μm, and/or less than 1 μm, which can, in some examples, function to reduce space charge effects associated with the thermionic current traversing the vacuum gap), and/or any other suitable TECs.

In some examples, one or more of the TECs can include one or more elements such as described in Campbell, M. F., Celenza, T. J., Schmitt, F., Schwede, J. W., & Bargatin, I. (2021). Progress toward high power output in thermionic energy converters. *Advanced Science,* 8(9), 2003812, which is herein incorporated in its entirety by this reference. However, the system can additionally or alternatively include any other TECs of any suitable design and/or arrangement.

Each TEC is preferably integrated with a heat source (but can additionally or alternatively receive a heat input in any other suitable manner). For example, the TECs can be arranged near and/or protrude into a high-temperature fluid. In a specific example, a plurality of TECs are each arranged at and/or near the surface of a high-velocity vehicle, such as wherein the TECs can harvest heat from an airstream surrounding the vehicle (e.g., airstream heated by traversal of the vehicle through the air).

Each TEC preferably defines a chamber (e.g., sealed chamber, such as a hermetically sealed chamber). The chamber is preferably evacuated (e.g., containing little or no atmospheric gases), but can alternatively have any suitable gases and/or other contents. The chamber preferably contains one or more work function reducing materials (e.g., cesium, cesium oxide, other alkali metals and/or oxides, alkaline earth metals and/or oxides, etc.). However, the chamber can additionally or alternatively have any other suitable contents.

Figure 3:
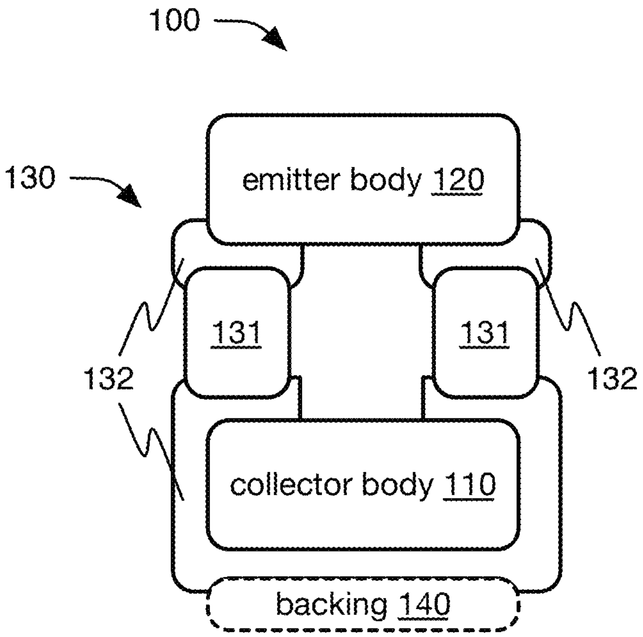
FIG. 3 is a schematic representation of an embodiment of a TEC of the energy converter system.
Figure 4A:
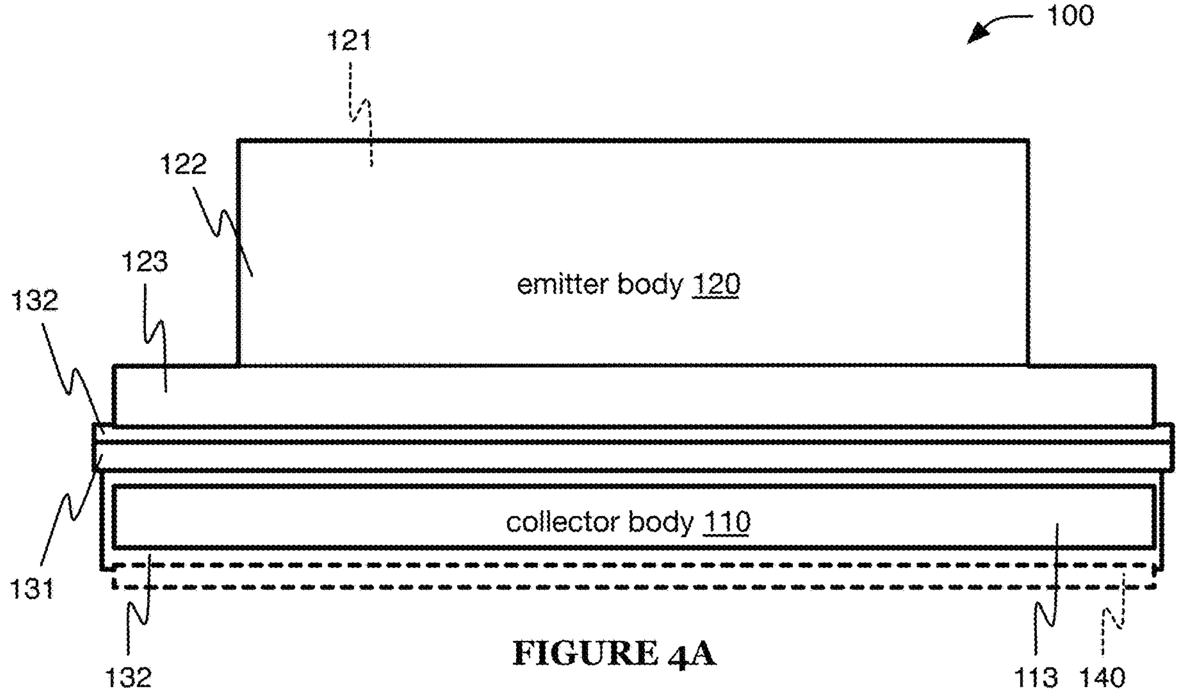
FIGS. 4A-4B are an elevation view and a cross-sectional elevation view, respectively, of an example of the TEC.

The TEC preferably includes a collector body 110, an emitter body 120, a seal 130, and optionally includes a backing 140 (e.g., as shown by way of examples in FIGS. 3, 4A, and/or 4B).

2.1.1 Emitter Body.

The emitter body 120 preferably defines an emitter surface 121, an emitter sidewall 122, and an emitter base 123 (e.g., as shown by way of examples in FIGS. 4A and/or 4B). The emitter surface 121 and emitter sidewall 122 preferably cooperatively define a cavity. In an alternate embodiment, the emitter body may not define a cavity (e.g., wherein the emitter body does not include an emitter sidewall; wherein a single face of the emitter body includes both the emitter surface 121 and a portion, such as an exterior portion arranged outward from the emitter surface, that is bonded to the seal; etc.).

The emitter body preferably includes (e.g., is made of) one or more conductive materials, more preferably refractory metals (e.g., tungsten, molybdenum, tantalum, niobium, rhenium, vanadium, zirconium, hafnium, ruthenium, osmium, iridium, etc.) and/or alloys (e.g., W—Re, W—Mo, W—Cu, TZM, MHC, Mo—Re, T-111, Ta-10 W, Ta—W—Re, Nb-1Zr, Nb521, FS-85, C-103, Nb-Ti, Re-W, Re-Mo, lanthanated tungsten, tungsten-heavy metal, etc.). In a first example, the emitter body includes (e.g., is made of) molybdenum. In a second example, the emitter body includes (e.g., is made of) TZM (e.g., an alloy of titanium, zirconium, and/or carbon in molybdenum, such as including about 0.5% Ti, 0.08% Zr, and 0.02% C in a balance of Mo). In a third example, the emitter body includes (e.g., is made of) rhenium (e.g., elemental rhenium, W—Re alloy, etc.). However, the emitter body can additionally or alternatively include any other suitable materials.

The emitter surface 121 (e.g., emitter face, plurality of faces, etc.) preferably functions to thermionically emit electrons.

The surface can be planar, curved (e.g., dished and/or concave toward the chamber interior), and/or have any other suitable shape. In specific examples, the thickness of the emitter surface can fall within the range 0.05-5 mm (e.g., 0.05-0.1, 0.1-0.2, 0.2-0.3, 0.3-0.5, 0.5-0.75, 0.75-1, 1-1.3, 1.3-2, 2-3, and/or 3-5 mm, etc.), but can additionally or alternatively be less than 0.05 mm, more than 5 mm, and/or have any other suitable thicknesses.

The emitter surface (and/or any other suitable portion(s) of the emitter body) preferably includes one or more protective coatings on its exterior (opposing the chamber interior across the emitter surface). The protective coatings preferably function to prevent oxidation and/or other degradation of the hot emitter surface (e.g., even at temperatures above 1450° C., such as 1600-2000° C., greater than 2000° C., etc.); one or more additional coatings (e.g., diffusion barrier) may also be present (e.g., between the bulk material and the coating that functions to prevent oxidation and/or other degradation). In a first example, a protective coating can be or includes silicon carbide (e.g., wherein a coating made of, or predominantly of, SiC will typically be effective for temperatures below 1450° C. but could additionally or alternatively function at temperatures above 1450° C., such as 1500-1600, 1600-1750, 1750-2000, and/or greater than 2000° C., etc.), optionally along with one or more additional coatings (e.g., arranged between the silicon carbide layer and the bulk material) such as diffusion barriers. In a second example, a protective coating can include $ZrB_2$ or $HfB_2$ (or alternatively, a mixture thereof) in combination with a smaller amount of SiC (e.g., $10^{-30}$% SiC, such as approximately 20% SiC), and optionally, one or more other additives (e.g., metal compounds, preferably refractory metal compounds, which may include silicides, borides, and/or carbides, such as $MoSi_2$, $TaB_2$, WC, $CrB_2$, etc.), optionally along with one or more additional coatings (e.g., arranged between the boride layer and the bulk material) such as diffusion barriers; such coatings may typically be effective for temperatures greater than 1450° C., such as some or all temperatures below 2000° C. In a third example, a protective coating can include one or more platinum-group metals and/or alloys thereof (e.g., bare platinum-group metal; platinum-group metal with an additional layer exterior to it, such as a hafnia coating; etc.), such as hafnia-coated iridium and/or hafnia-coated ruthenium (e.g., for temperatures exceeding 2000° C.), optionally along with one or more additional coatings (e.g., arranged between the platinum-group metal layer and the bulk material) such as diffusion barriers. In a fourth example, a protective coating can include a multilayer coating (e.g., $MoSi_2$/SiC multilayer, $Al_2O_3$/$SiO_2$ multilayer, HfC/SiC multilayer, $ZrO_2$/SiC multilayer, $Si_3N_4$/SiC multilayer, Mullite/$Al_2O_3$ multilayer, etc.; multilayer including three or more different layer compositions, such as compounds from the preceding elements of this list and/or any other suitable compounds, etc.). However, the emitter surface (and/or any other suitable portion(s) of the emitter body) can additionally or alternatively include any other suitable protective coatings (or can alternatively include no such coating).

The emitter sidewall 122 preferably functions to electrically and/or mechanically couple the emitter surface to the emitter base. For example, the emitter sidewall can extend away from a perimeter (e.g., circumference) of the emitter surface toward the emitter base, more preferably wherein the emitter sidewall is connected to the entire perimeter of the emitter surface, but alternatively, wherein the emitter sidewall is connected to the emitter surface in any other suitable manner. The emitter sidewall preferably extends normal or substantially normal to the emitter base (e.g., to a broad surface defined thereon), but can alternatively extend at an oblique angle or any other suitable angle.

The emitter base 123 preferably functions to mechanically couple the emitter body 120 to the collector body 110 (e.g., via the seal 130). The emitter base preferably defines a flat base extending outward from the emitter sidewall. For example, the emitter base can include (e.g., be) a flat disk with a hole defined at the sidewall.

However, the emitter body can additionally or alternatively include any other suitable elements in any suitable arrangement. Note that, beyond the emitter surface, the emitter body preferably includes a lesser amount of protective coating (e.g., protective coatings such as described above regarding the emitter surface) as compared with the protective coatings on the emitter surface (e.g., as such coatings can be highly thermally conductive, resulting in parasitic heat loss from the emitter surface). In examples, beyond the emitter surface, the protective coatings can have reduced thickness, could omit one or more layers, and/or could have a different composition (e.g., different layers than on the emitter surface). However, the emitter body can alternatively have uniform or substantially uniform protective coatings across its entirety or any suitable subset thereof, can have no or substantially no coatings, and/or can have any other suitable coatings of any composition.

Figure 4B:
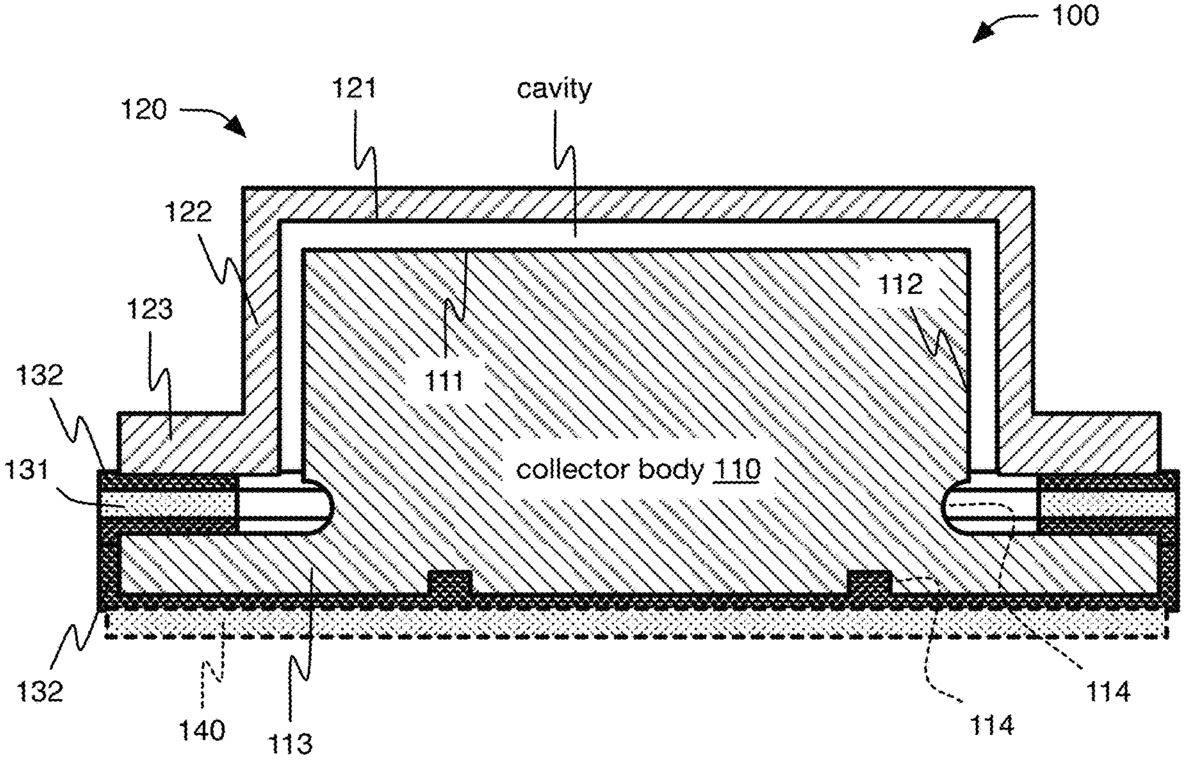
Figure 4C:
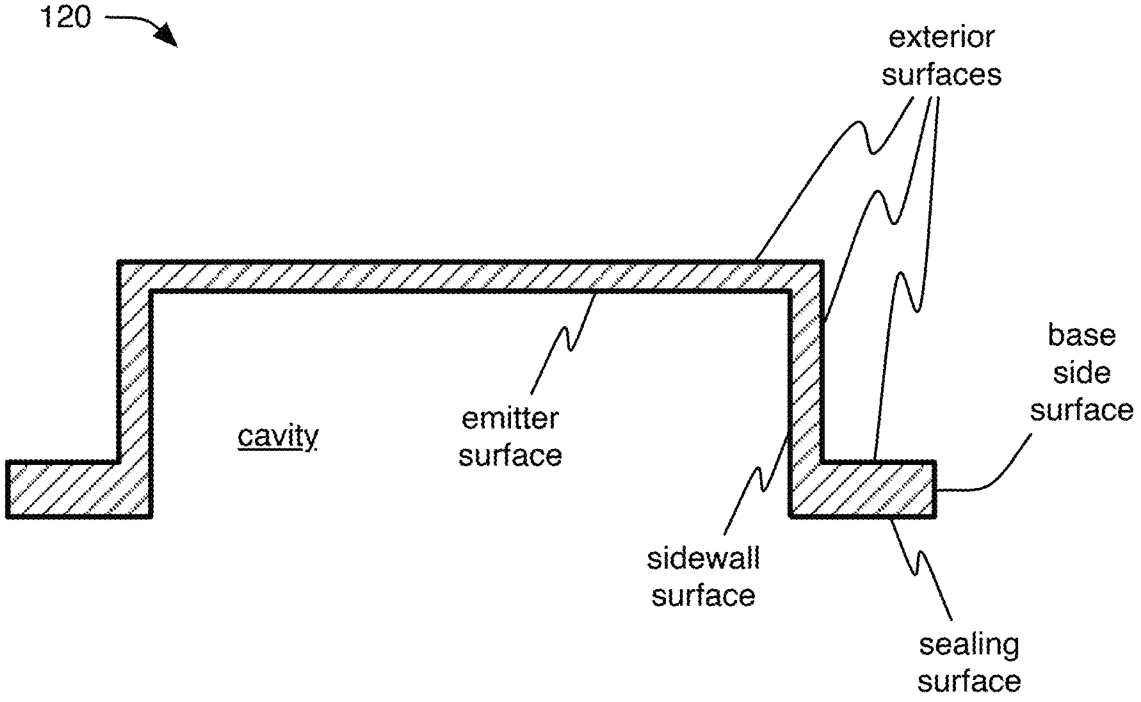
FIGS. 4C-4D are cross-sectional elevation views of an example of an emitter body and a collector body, respectively, of the TEC.

Note that, although referred to herein as a "surface", the emitter surface 121 does not necessarily refer to a two-dimensional manifold, but rather can refer to a superficial portion of the emitter body (e.g., from which electrons are thermionically emitted into the gap between the emitter and collector). Further, although referred to as the "emitter surface", the emitter will typically include one or more additional surfaces that are not included in and/or defined by the emitter surface 121 (e.g., one or more surfaces included in and/or defined by other portions of the emitter body, such as the emitter sidewall and/or emitter base). For example, the emitter sidewall can define one or more sidewall surfaces (e.g., which also bound the gap between the emitter and collector, but face the collector sidewall rather than facing the collector surface), such as a sidewall surface abutting the emitter surface (e.g., as shown in FIG. 4C). Additionally or alternatively, the emitter base can define one or more base surfaces, such as a sealing surface (e.g., abutting the sidewall surface; facing the collector base across the seal; including both a first portion, such as a portion abutting the sidewall surface, arranged within the TEC interior, and a second portion bonded to the seal by braze material; etc.), and one or more exterior surfaces not arranged within the TEC interior, such as a base side surface (e.g., extending from the sealing surface), such as shown by way of example in FIG. 4C.

2.1.2 Collector Body.

The collector body 110 is preferably arranged within (e.g., partially within) the cavity defined by the emitter body. The collector body preferably defines a collector surface 111, a collector sidewall 112, and a collector base 113, and can optionally define one or more collector recesses 114 (e.g., as shown by way of example in FIG. 4B). In an alternate embodiment, the collector body may not be arranged within a cavity (e.g., wherein the emitter body does not define a cavity, wherein the emitter body defines a cavity but the collector body is arranged entirely or substantially entirely outside the cavity, etc.), such as wherein the collector body does not define a collector sidewall (e.g., wherein a single face of the collector body includes both the collector surface 111 and a portion, such as an exterior portion arranged outward from the collector surface, that is bonded to the seal).

The collector body preferably includes (e.g., is made of) one or more conductive materials, more preferably refractory metals (e.g., tungsten, molybdenum, tantalum, niobium, rhenium, vanadium, zirconium, hafnium, ruthenium, osmium, iridium, etc.) and/or alloys (e.g., W—Re, W—Mo, W—Cu, TZM, MHC, Mo—Re, T-111, Ta-10 W, Ta—W—Re, Nb-1Zr, C-103, Nb—Ti, Re—W, Re—Mo, etc.). The collector body can include the same materials as the emitter body and/or different materials from the emitter body. In a first example, the collector body includes (e.g., is made of) molybdenum. In a second example, the collector body includes (e.g., is made of) TZM (e.g., an alloy of titanium, zirconium, and/or carbon in molybdenum, such as including about 0.5% Ti, 0.08% Zr, and 0.02% C in a balance of Mo). In a third example, the collector body includes (e.g., is made of) rhenium (e.g., elemental rhenium, W—Re alloy, etc.). However, the collector body can additionally or alternatively include any other suitable materials.

The collector surface 111 (e.g., collector face, plurality of faces, etc.) is preferably arranged close to the emitter surface 121. For example, the collector and emitter surfaces (e.g., wherein the collector and emitter surfaces are planar or substantially planar, preferably in a parallel or substantially parallel arrangement with respect to each other) can define a constant or substantially constant gap width (e.g., inter-electrode spacing) between the two of them. In examples, the gap width can be 0.1-10 μm (e.g., 0.5-3 μm, 0.75 μm, 1 μm, 2 μm, etc.), 50-100 nm, less than 50 nm, $10^{-25}$ μm, 25-50 μm, 50-100 μm, 100-250 μm, 250-500 μm, 500-1000 μm, 1-2 mm, 2-5 mm, 5-10 mm, or greater than 10 mm. For example, for a TEC with no plasma between the electrodes during operation (e.g., "micro-gap TEC"), the gap width is preferably 0.1-10 μm (more preferably 0.5-3 μm), whereas for a plasma-based TEC, the gap width is preferably 25-5000 μm (more preferably 100-3000 μm), or for a surface ionization (e.g., Knudsen) based TEC, the gap width is preferably 0.3-500 μm (more preferably 1-150 μm). However, the TEC can additionally or alternatively define any other suitable gap of any suitable width(s). Additionally or alternatively, the surfaces can define a varying gap width along their surface, the surfaces can be dissimilar from each other, and/or the surfaces can have any other suitable relationship.

Figure 4D:
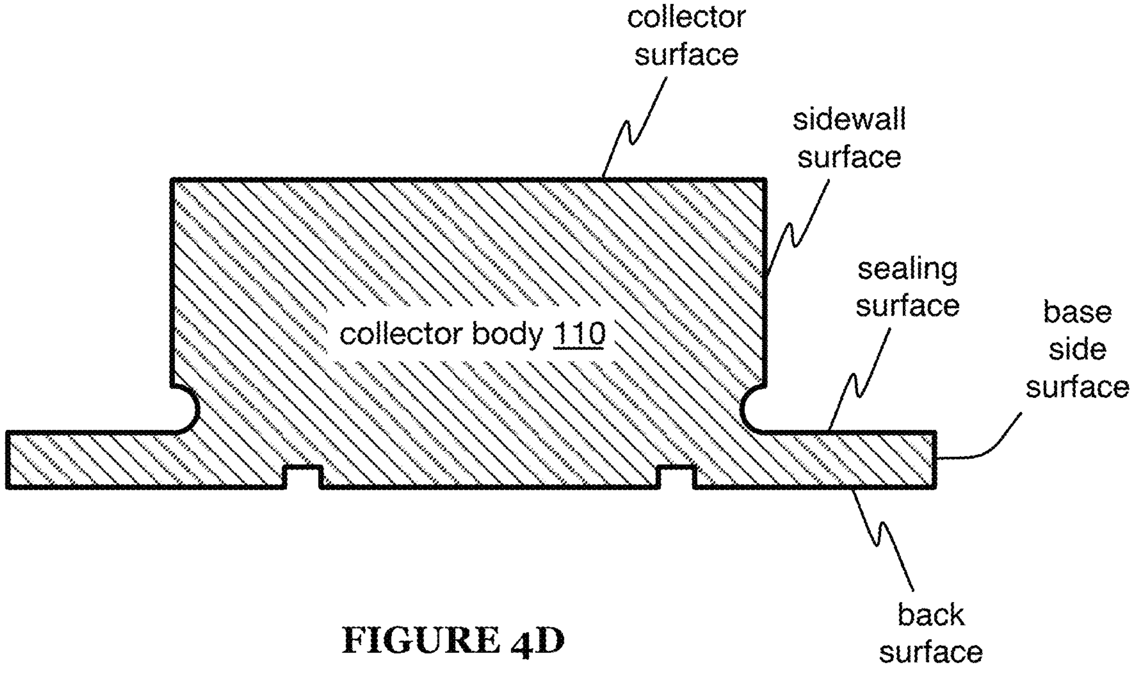

Note that, although referred to herein as a "surface", the collector surface 111 does not necessarily refer to a two-dimensional manifold, but rather can refer to a superficial portion of the collector body (e.g., at which electrons thermionically emitted by the emitter surface are collected from the gap between the emitter and collector). Further, although referred to as the "collector surface", the collector will typically include one or more additional surfaces that are not included in and/or defined by the collector surface 111 (e.g., one or more surfaces included in and/or defined by other portions of the collector body, such as the collector sidewall and/or collector base). For example, the collector sidewall can define one or more sidewall surfaces (e.g., which also bound the gap between the emitter and collector, but face the emitter sidewall rather than facing the emitter surface), such as a sidewall surface abutting the collector surface (e.g., as shown in FIG. 4D). Additionally or alternatively, the collector base can define one or more base surfaces, such as a sealing surface (e.g., abutting the sidewall surface; facing the emitter base across the seal; including both a first portion, such as a portion abutting the sidewall surface, arranged within the TEC interior, and a second portion bonded to the seal by braze material; etc.), a back surface (e.g., opposing the seal surface across the emitter base, arranged proximal the backing relative to the rest of the collector base, not arranged within the TEC interior, etc.), and/or a base side surface (e.g., extending between the sealing surface and the back surface, not arranged within the TEC interior, etc.), such as shown by way of example in FIG. 4D.

The collector sidewall 112 preferably functions to electrically and mechanically couple the collector surface 111 to the collector base 113. In some examples, the collector sidewall is analogous in shape and/or arrangement within the collector body to the shape and/or arrangement of the emitter sidewall within the emitter body. In other examples, the collector surface and sidewall are surfaces defined by a boss extending away from the collector base (e.g., as shown by way of example in FIG. 4B). For example, the collector sidewall can extend away from the perimeter of the collector surface toward the collector base, preferably being connected to the collector surface around its entire perimeter (e.g., wherein the collector sidewall is the sidewall of a boss extending away from the collector base, and the collector surface is a broad face of the boss opposing the collector base across the boss), but alternatively, to any suitable subset thereof, and/or having any other suitable connectivity to the emitter surface. Further, the collector sidewall preferably extends normal or substantially normal to the collector base, but can alternatively extend at an oblique angle or any other suitable angle. In one example, the emitter sidewall and collector sidewall each define a cylindrical section wherein the two cylindrical sections are substantially coaxial, with the collector sidewall having a smaller radius than the emitter sidewall (e.g., as shown in FIG. 4B). However, the collector sidewall 112 can additionally or alternatively have any other suitable shape, function, and/or arrangement.

The collector body can optionally define one or more collector recesses 114. The recess(es) can function to provide accumulation locations for the braze material 132, such as to prevent (e.g., during the brazing process, while the braze material is liquid, etc.) excess braze material from reaching undesired locations and/or creating undesired (thermal and/or electrical) bridging (e.g., between the collector and emitter). In examples, these recesses 114 can include one or more recesses defined in the collector base (e.g., defined into a broad face of the collector base that opposes the collector surface across the collector base, defined into a broad face of the collector base at or near the intersection of the base with the collector sidewall, etc.) and/or defined in the collector sidewall (e.g., defined at and/or near an intersection between the collector sidewall and base, defined at any other suitable location on the collector sidewall, etc.). For example, the recesses can include one or more recesses defined at the intersection between the collector base and sidewall (e.g., concavity defined along part or all of this intersection, such as along the entire circumference of the sidewall at the base). Additionally or alternatively, the recesses can include one or more holes (e.g., blind holes) defined in the collector base (e.g., opening on a back side of the collector base, such as a broad face that opposes the collector surface across the collector base and/or a broad face proximal to the backing 140). However, these recesses can additionally or alternatively be defined in the collector surface and/or in any other suitable location(s).

In one variation, the collector body includes (e.g., is) a flat disk with a boss extending (e.g., normal to the disk) into the cavity defined by the emitter body (wherein the boss includes the collector sidewall 112 and surface 111, and the disk defines the collector base 113), with one or more collector recesses 114 defined in the collector body (e.g., concavity defined along the intersection between the collector base and sidewall, one or more blind holes defined in the collector base and opening on a back side of the collector base, etc.), such as shown by way of example in FIG. 4B. However, the collector body 110 can additionally or alternatively include any other suitable structures having any suitable arrangement and/or functionality.

2.1.3 Seal.

The seal 130 preferably functions: to seal the TEC interior (defined by the emitter body, collector body, and seal), more preferably fluidly decoupling the TEC interior from the surrounding atmosphere (e.g., defining a hermetic seal separating the TEC interior from the surrounding atmosphere, preferably isolating the chamber environment from an ambient environment); to mechanically connect the emitter body to the collector body; and/or to electrically insulate the emitter body from the collector body. In some examples, the seal 130 includes an insulator 131 and one or more braze materials 132 (e.g., as shown in FIGS. 3, 4A, and/or 4B).

The insulator 131 preferably functions (e.g., in cooperation with the braze material 132) to isolate the system from an external environment proximal the system (e.g., surrounding the system). The insulator (e.g., in cooperation with the braze material 132) can additionally or alternatively function to dissipate energy from the electron collector, provide mechanical support to the electron collector and/or the system, and/or provide any other suitable function. The insulator is preferably coupled to the collector and emitter. The insulator is preferably arranged between the collector body and emitter body (e.g., between the collector base and the emitter base, such as between an upper side of the collector base and a lower side of the emitter base). For example, the seal can be connected (e.g., mechanically, thermally, etc.) and/or otherwise coupled to the collector and emitter (e.g., the bases thereof) on at least one broad face each of the collector and emitter, preferably connected to a first broad face of the collector base opposing a second broad face of the emitter base (e.g., as shown in FIGS. 3 and/or 4B). More preferably, this coupling and/or connection is achieved via the braze material(s), such as wherein a first portion of braze material is arranged between the insulator and the collector base, preferably connecting the insulator to the collector base, and/or wherein a second portion of braze material, separate from the first portion, is arranged between the insulator and the emitter base, preferably connecting the insulator to the emitter base; note that, in some examples, the seal can include more than one braze material, such as wherein the first portion is or includes a first braze material and the second portion is or includes a second braze material different from the first. However, the insulator can additionally or alternatively be coupled to the collector and/or emitter in any suitable manner.

The insulator (e.g., in cooperation with the braze material 132, emitter body, and/or collector body) preferably defines a chamber that surrounds the emitter surface and collector surface. The chamber is preferably fluidly isolated from an ambient environment (e.g., atmospheric air) surrounding the system and/or the seal (e.g., wherein a hermetic seal separates the chamber from the ambient environment). The chamber environment is preferably at a reduced pressure (e.g., full or partial vacuum) compared to the ambient environment, but can be at the same pressure and/or an elevated pressure. The chamber can enclose one or more species (e.g., barium, cesium, oxygen, sodium, strontium, zirconium, etc.), such as species that can interact with one or more surfaces (e.g., emitter surface, collector surface, etc.) to modify (e.g., reduce) the work function of the surface(s), to alter the contents of the chamber (e.g., act as a getter, such as by removing one or more undesired species from the chamber), and/or have any other suitable function(s). In some examples, one or more such species can be stored as fill materials (e.g., as described below in further detail), such as wherein the fill material generates a vapor pressure of the species within the chamber. In variants, such as wherein the one or more species are present in a fluid phase (e.g., gas), the pressure (and/or partial pressure) of each species (and/or of all such species together), such as during normal system operation, can be greater than a first threshold pressure (e.g., $1\times10^{-6}$, $2\times10^{-6}$, $5\times10^{-6}$, $1\times10^{-5}$, $2\times10^{-5}$, $5\times10^{-5}$, $1\times10^{-4}$, $2\times10^{-4}$, $5\times10^{-4}$, $1\times10^{-3}$, $2\times10^{-3}$, $5\times10^{-3}$, $1\times10^{-2}$, $2\times10^{-2}$, $5\times10^{-2}$, $1\times10^{-1}$, $2\times10^{-1}$, $5\times10^{-1}$, 1, 2, 5, 10, 20, 50, 100, 200, 500, 760, 800, $10^{-6}$, $10^{-2}$, $10^{-3}$, $10^{-1}$, 0.05-5, 0.75-15, and/or 5-100 Torr, greater than 800 Torr, less than $10^{-6}$ Torr, etc.), less than a second threshold pressure (e.g., $1\times10^{-6}$, $2\times10^{-6}$, $5\times10^{-6}$, $1\times10^{-5}$, $2\times10^{-5}$, $5\times10^{-5}$, $1\times10^{-4}$, $2\times10^{-4}$, $5\times10^{-4}$, $1\times10^{-3}$, $2\times10^{-3}$, $5\times10^{-3}$, $1\times10^{-2}$, $2\times10^{-2}$, $5\times10^{-2}$, $1\times10^{-1}$, $2\times10^{-1}$, $5\times10^{-1}$, 1, 2, 5, 10, 20, 50, 100, 200, 500, 760, 800, $10^{-6}$, $10^{-2}$, $10^{-3}$, $10^{-1}$, 0.05-5, 0.75-15, and/or 5-100 Torr, greater than 800 Torr, less than $10^{-6}$ Torr, etc.), and/or any suitable pressure (or partial pressure). In a specific example, during normal system operation, the system includes a vapor pressure of one or more species present in the fill material (e.g., cesium) between 0.1 and 10 Torr (e.g., 0.2-5, 0.5-2, and/or about 1 Torr, etc.). However, the chamber can additionally or alternatively have any other suitable properties.

The insulator preferably includes one or more electrically insulating materials, more preferably materials that can withstand (e.g., without melting, deforming, decomposing, and/or chemically reacting with other species present in the chamber environment, etc.) the seal temperature during TEC operation (and/or during fabrication, such as during brazing). The materials are preferably glass and/or ceramic (e.g., bulk ceramic, deposited ceramic, etc.; crystalline and/or amorphous ceramics). For example, the insulator can include one or more boride, carbide, oxide, and/or nitride materials and/or any other suitable materials. In specific examples, the insulator includes one or more of alumina (e.g., sapphire, amorphous alumina, etc.), aluminum nitride, silica, silicate glass, silicon, silicon carbide, silicon nitride, and/or any other suitable materials. However, the insulator can additionally or alternatively include any other suitable materials.

The braze material 132 preferably functions to connect the insulator 131 to the collector body and/or emitter body (e.g., forming a hermetic seal, such as described above). The braze material can additionally or alternatively function as a protective coating (e.g., for the collector body and/or any other suitable elements of the system), such as protecting the exterior surfaces (surfaces not within and/or defining the perimeter of the TEC chamber, surfaces that may be exposed to the ambient environment during TEC operation, etc.) of some or all elements of the system (e.g., of the collector body) during TEC operation and/or at any other suitable times (e.g., protecting such surfaces from oxidation and/or other degradation while they are at elevated temperatures).

A first portion of the braze material 132 is preferably arranged between the insulator 131 and the emitter body (e.g., a lower broad surface of the emitter base), more preferably mechanically connecting and forming a seal (e.g., hermetic seal) therebetween. A second portion of the braze material 132 is preferably arranged between the insulator 131 and the collector body (e.g., an upper broad surface of the collector base), more preferably mechanically connecting and forming a seal (e.g., hermetic seal) therebetween. The first and second portions of braze material are preferably not connected to each other (e.g., not electrically connected), such as wherein they are separated by the insulator 131, so as to prevent undesired electrical shorting between the emitter and collector (e.g., as shown by way of example in FIGS. 4A-4B).

Additionally or alternatively, the braze material 132 can be arranged as a coating (e.g., protective coating) for some or all of an exterior portion of the collector body (e.g., portion of the collector body that is not within and/or defining a boundary of the TEC chamber), such as shown by way of example in FIGS. 4A-4B. For example, a protective coating for the collector body can be connected to (or alternatively, separate from) the second portion of braze material described above; analogously, a protective coating for the emitter body, if desired, could optionally be connected to the first portion of braze material described above. The coating preferably forms a complete coating over the desired surface(s), but can alternatively define any suitable coating.

The braze material is preferably an active braze alloy (e.g., configured to enable brazing of insulating materials, such as brazing an unmetallized insulator to a metal and/or to another insulator), but can additionally or alternatively be any other suitable type of braze material and/or other material. The braze material preferably includes one or more: base metals, active elements, and/or scale-forming elements. Although referred to as 'elements', a person of skill in the art will recognize that the active elements and/or scale-forming elements can additionally or alternatively include any suitable compounds.

The braze material base metal (and/or the braze material as a whole) preferably has high mobility for diffusion of desired elements and/or compounds (e.g., protective elements, such as scale-forming elements, etc.), but can additionally or alternatively have any suitable mobilities for any suitable elements and/or compounds. The base metal (and/or the braze material as a whole) preferably has low mobility for oxygen diffusion through its bulk (e.g., so that the braze material can act effectively as a protective coating to prevent and/or reduce oxidation of the elements that it coats). The base metal (and/or the braze material as a whole) preferably has a high melting point (e.g., melting point at or above 900° C., 1000° C., 1200° C., etc.), but can alternatively have any other suitable melting point. The base metal (and/or the braze material as a whole) preferably does not form a robust surface oxide (e.g., forms volatile surface oxides that can evaporate away, does not form significant surface oxides, etc.), but can additionally or alternatively form any other suitable oxides. In examples, the base metal(s) can include copper, platinum group metals (e.g., platinum, iridium, rhodium, palladium, etc.), iron, nickel, silver, aluminides, intermetallic compounds (e.g., which may exhibit more desirable diffusion properties as compared with elemental metals) such as silicide and/or aluminide intermetallic compounds, and/or any other suitable metals. However, the braze material can additionally or alternatively include any other suitable base metal(s).

In some examples (e.g., in which the braze material includes one or more platinum group metals, especially in which it includes one or more platinum group metals as a base metal and/or a majority component of the braze material), the system can include one or more diffusion barriers (e.g., arranged between the braze material and some or all surfaces it coats and/or contacts, such as between the braze material and the collector body, between the braze material and any elements that contain tungsten, etc.) configured to prevent diffusion of one or more elements and/or compounds (e.g., diffusion of platinum group metals, diffusion of tungsten, etc.). The diffusion barrier can function to prevent and/or reduce undesired sintering (e.g., of elements containing tungsten), and/or have any other suitable function. However, the system can additionally or alternatively include any other suitable barriers of any kind, or can include no such barriers.

The active element preferably functions to promote wetting of insulators (e.g., ceramics) by the braze material (e.g., during brazing). In examples, the active element(s) can include titanium, zirconium, and/or any other suitable elements and/or compounds.

The scale-forming element preferably functions to promote formation of a scale (e.g., oxide scale), such as at the surface (e.g., exposed surface, such as exposed to the ambient environment) of the braze material. This scale can function as an oxygen barrier (e.g., wherein the scale has lower oxygen permeability than the bulk braze material), a mechanical barrier (e.g., preventing and/or reducing deformation of the braze material during operation at elevated temperatures, wherein the scale has a higher melting point than the bulk braze material, wherein the scale adheres well to the bulk braze material, etc.), and/or have any other suitable function(s). In some examples, the scale can be self-healing (e.g., wherein the scale-forming element is able to continuously diffuse through the braze material to the surface, thereby maintaining the protective scale during operation at elevated temperatures). In examples, the scale-forming element(s) can include aluminum, silicon, zirconium, hafnium, titanium, chromium, and/or any other suitable elements and/or compounds.

In a first example, the braze material is a copper-based active braze alloy (Cu ABA) that includes copper as the base metal, along with silicon, aluminum, and titanium (e.g., wherein aluminum and/or silicon act as scale-forming elements and titanium acts as the active element). In a specific example, the Cu ABA includes about 3% silicon, about 2% titanium, and about 2% aluminum by weight, with the balance being copper (or mostly copper).

In a second example, the braze material is a palladium- and/or nickel-based active braze alloy (PalNiSi) that includes palladium and/or nickel as the base metal(s) and includes silicon (e.g., as both a scale-forming element and an active element). In a specific example, the PalNiSi braze alloy includes about 6% silicon by weight, with the balance being split (e.g., split equally or approximately equally) between palladium and nickel.

In a third example, the braze material is an active braze alloy based on copper and silver (CuSil ABA) that includes copper and silver as the base metals and includes titanium (e.g., as an active element and/or scale-forming element). In a specific example, the CuSil ABA includes about 2% titanium by weight, with the balance being split (e.g., split at approximately a 2:1 ratio) between silver and copper (e.g., about 63% silver and about 35% copper).

In a fourth example, the braze material is a titanium-based active braze alloy that includes titanium, nickel, and copper, and optionally includes zirconium. In a first specific example, the alloy includes about 60-70% Ti, about 15-25% Ni, and about 15% Cu (optionally along with a small amount, such as less than 1%, of other additives). In a second specific example, the alloy includes about 40% Ti, about 20% Ni, about 20% Cu, and about 20% Zr (optionally along with a small amount, such as less than 1%, of other additives).

In a fifth example, the braze material is an active braze alloy including nickel, titanium, and aluminum.

However, the braze material can additionally or alternatively include any other suitable elements and/or compounds.

Further, the seal 130 can additionally or alternatively include any other suitable structures having any suitable arrangement and/or functionality.

2.1.4 Backing.

The TEC can optionally include a backing 140.

The backing is preferably insulating (e.g., electrically insulating), such as being made of one or more insulating materials (e.g., ceramics and/or glasses). The backing can function to electrically insulate the TEC (e.g., the collector base, such as a lower broad face of the collector base) from other elements (e.g., from electrical conductors arranged near and/or in contact with the TEC). The backing is preferably arranged proximal to the collector body (e.g., to a lower broad face of the collector base), such as proximal an exterior portion (e.g., not contained within and/or defining a perimeter of the TEC chamber) of the collector base (e.g., as shown by way of examples in FIGS. 3 and/or 4A-4B). The backing is preferably mechanically connected to the collector body, such as wherein the backing is brazed to the collector base (e.g., connected by the braze material 132). For example, the TEC can include an insulating backing disk arranged opposing the collector face and/or TEC cavity across the collector body (e.g., across the collector base), wherein braze material is preferably arranged between the insulating backing disk and a lower broad face of the collector base, mechanically connecting the insulating backing disk to the collector base.

In some variants, the backing thermally couples the collector (e.g., collector base) to one or more other elements of the system. In such variants, the backing preferably does not add significant thermal resistance between the collector and the other element(s) to which the collector is thermally coupled. For example, the backing may include (e.g., be made of) one or more thermally conductive materials (e.g., aluminum oxide, aluminum nitride, silicon carbide, silicon nitride, etc.). Additionally or alternatively, the backing may be relatively thin (e.g., along a direction normal or substantially normal to a broad face of the backing and/or of the collector, such as a broad face along with the backing and collector are brazed or otherwise bonded), more preferably also being relatively broad along one or more dimensions parallel to the broad face and/or normal to the direction in which the backing is thin, such that the thermal resistance presented by the backing is reduced (e.g., despite use of a backing material with low thermal conductivity). Additionally or alternatively, a temperature gradient can be engineered (e.g., resulting in reduced TEC efficiency) to match (or substantially match) the collector heat rejection temperature to an available reservoir temperature. However, the backing can additionally or alternatively have any other suitable thermal properties.

However, the TEC can additionally or alternatively include any other suitable backing, or can include no such element(s).

Further, the TEC and/or the system can additionally or alternatively include any other suitable elements in any suitable arrangement and/or having any suitable functionality.

2.2 Electrical Power Converter.

The electrical power converter 200 preferably functions to optimize operation of each TEC of the system and/or convert the output of the one or more TECs to a desired output characteristic (e.g., constant output voltage). In examples, optimizing operation of the TECs can include maintaining their operation at an optimal point on their respective I-V curve, wherein this can include controlling the operation point along the I-V curve to optimize device temperature (e.g., for lower input heat fluxes, tuning to a higher voltage, resulting in an increased emitter temperature; for higher input heat fluxes, tuning to a lower voltage, resulting in decreased emitter temperatures; etc.).

The electrical power converter can include a power optimization module, an electrical power converter, and/or any other suitable elements. For example, the power optimization module can function to drive operation of each TEC to an optimal point on its I-V curve (e.g., for a given input heat flux and/or other operational characteristics), and the electrical power converter can function to convert the TEC outputs to a desired output characteristic.

In one example, the electrical power converter includes a maximum power point (MPP) tracker and a DC-DC converter, and can optionally include one or more additional converters (e.g., second stage converter).

In this example, the MPP tracker preferably functions to maintain operation of each TEC at the optimal point on the I-V curve, more preferably accounting for temperature effects on the TEC efficiency (but alternatively, not accounting for temperature effects such as acting as a simple MPP tracker analogous to a photovoltaic MPP tracker). In this example, the DC-DC converter preferably functions to convert the output electrical power from the TECs to a fixed voltage (e.g., 28 V); in specific examples, the DC-DC converter can be integrated with the MPP tracker or separate from the MPP tracker. The additional converters can function to convert the output of the DC-DC converter into a desired output, such as a higher DC voltage (e.g., a second DC-DC converter that functions to convert the first DC-DC converter's output to a higher DC voltage, optionally, additional DC-DC converters operating sequentially on the output of the preceding converters, etc.).

However, the electrical power converter 200 can additionally or alternatively include any other suitable elements having any suitable arrangement and/or functionality. Further, the system can additionally or alternatively include any other suitable elements having any suitable arrangement and/or functionality.

3. Method of Fabrication

As described above, the method of fabrication preferably includes placing braze material, heating the system, and cooling the system.

Placing braze material preferably includes placing one or more foils of the braze material in contact with the seal, more preferably placing a first foil between the seal (e.g., a first broad face thereof) and the emitter body (e.g., the base thereof) and placing a second foil between the seal (e.g., a second broad face thereof, wherein the second broad face opposes the first broad face across the seal) and the collector body (e.g., the base thereof); note that, in some examples, multiple foils may be placed together (e.g., in a stack) to provide a thicker layer of braze material. Additionally or alternatively, placing braze material can include placing braze material (e.g., a similar foil to that placed adjacent to the seal, a thicker foil, multiple foils such as a stack of foils, a thicker disc, a thinner foil, a non-uniform film, a paste, one or more discontinuous pieces that do not cover the entire surface, etc.) between the collector body and the backing, and/or placing braze material in any other suitable location(s).

The foils (and/or stacks of foils, in examples in which a stack of foils are placed together) can have thicknesses in the range 0.01-0.2 mm (e.g., 0.01-0.02, 0.02-0.05, 0.04-0.06, 0.05-0.085, 0.07-0.08, 0.08-0.1, 0.1-0.14, and/or 0.14-0.2 mm, etc.), less than 0.01 mm, and/or greater than 0.2 mm. In a first specific example, the foils are about 0.05 mm thick. In a second specific example, the foils are about 0.075 mm thick. However, the foils can additionally or alternatively have any other suitable thickness(es).

The braze material is preferably a braze material as described above (e.g., Cu ABA), but can additionally or alternatively include any other suitable materials.

However, the method can additionally or alternatively include placing any other suitable braze materials in any other suitable locations and/or any other suitable manners.

Heating the system preferably includes heating to a soak temperature range, dwelling within the soak temperature range, and then heating to a brazing temperature (e.g., greater than the soak temperature range). Heating the system is preferably performed after placing the braze material, but can additionally or alternatively be performed before placing the braze material, concurrent with placing the braze material, and/or with any other suitable timing.

Heating to and dwelling within the soak temperature range preferably functions to allow the system to reach a more uniform (e.g., substantially uniform) temperature close to the brazing temperature (e.g., thereby reducing temperature non-uniformities when heating to the brazing temperature). Dwelling is preferably performed such that, by the end of the dwell time, the entire system lies within the soak temperature range (e.g., is at a substantially constant temperature throughout). The dwell temperature range is preferably below a melting temperature (e.g., solidus) of the braze material (e.g., to ensure that brazing does not begin during the dwell), but can additionally or alternatively be any other suitable temperature.

In a first example, in which the system includes molybdenum (e.g., substantially pure molybdenum), such as wherein the emitter body and/or collector body are made of molybdenum, its oxide will typically volatilize during the soak, leaving a bare or substantially bare metal surface by the end of the soak (e.g., resulting in rapid flow of braze material along the Mo surface when heated to the brazing temperature). In a second example, in which the system includes a molybdenum alloy including titanium and/or zirconium (e.g., TZM), such as wherein the emitter body and/or collector body are made of TZM, the oxides of titanium and/or zirconium will typically persist on the surface during the dwell, and so oxide will still coat the surfaces at the end of the soak (e.g., resulting in more moderate, uniform flow of the braze material when heated to the braze temperature). However, the system can additionally or alternatively include any other suitable materials and/or have any other suitable surface characteristics after the soak.

Heating to the brazing temperature preferably functions to cause the braze material to melt and/or flow. The brazing temperature is preferably above a melting temperature (e.g., solidus and/or liquidus) of the braze material. Heating to the brazing temperature is preferably performed rapidly and/or over a short period of time (e.g., in contrast with a slow rise to and/or dwell within the soak temperature range; in contrast with a longer period of time spent rising to and/or dwelling at the soak temperature, such as due to the much smaller difference between soak and braze temperatures as compared with the difference between ambient and soak temperatures; etc.), but can additionally or alternatively be performed at any other suitable rate.

The resulting braze thickness (e.g., across most of the braze area, between the seal and the emitter body, between the seal and the collector body, etc.) will typically be a fraction of the original braze material thickness (e.g., 20%, 30%, 40%, 50%, 60%, 70%, 80%, 90%, 5-20%, 20-40%, 40-60%, 60-80%, 80-95%, etc.). Note that the braze may remain thicker in some regions, such as near tubes and/or other features, and/or may be thinner in some regions, such as near the edge of the braze flow; further, in examples in which the system (e.g., collector body) includes one or more recesses (e.g., engineered recesses, undesired recesses such as manufacturing defects, etc.), the braze thickness will typically be greater within such recesses. In one example, in which the initial braze material is a 0.05-0.08 mm foil, the final braze thickness is approximately half (e.g., 40-60%, 35-65%, etc.) the starting thickness, resulting in a film of braze material having a thickness of about 0.02-0.05 mm (e.g., for a 0.05 mm film, a resulting thickness of 0.02-0.03 mm; for a 0.075 mm film, a resulting thickness of 0.035-0.045 mm; etc.). However, the resulting braze can additionally or alternatively have any other suitable thicknesses and/or other characteristics.

Once the braze material has flowed during the heating process (e.g., and equilibrated or substantially equilibrated, and reached a desired condition, for a threshold period of time, before flowing around the seal and shorting the collector to the emitter, etc.), the method preferably includes cooling the system. Cooling the system can be performed passively (e.g., by ceasing to heat the system or reducing heating of the system, thereby allowing it to cool), actively (e.g., via forced air cooling and/or other forced fluid cooling, via heat exchangers, etc.), and/or any other suitable manner. In some examples, the system can be held at one or more intermediate temperatures (e.g., between the braze temperature and an ambient temperature or target final temperature) during the cooling process (e.g., in a manner analogous to the soak performed prior to reaching the braze temperature). The system can be cooled to an ambient temperature (e.g., room temperature), an elevated temperature (e.g., system operation temperature), and/or any other suitable temperature.

However, the method of fabrication can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A thermionic energy converter (TEC) comprising:
- an emitter body comprising:
  - a first electrical output; and
  - an emitter face electrically coupled to the first electrical output;
- a collector body comprising:
  - a second electrical output; and
  - a collector face opposing the emitter face across a gap defined between the collector face and the emitter face; and
- a seal that mechanically connects the emitter body to the collector body, wherein the seal does not electrically connect the emitter body to the collector body, the seal comprising:
  - an insulator arranged between the collector body and the emitter body, the insulator bonded to the emitter body, wherein the TEC defines an interfacial volume between the insulator and the collector body; and
  - a braze material;

wherein:
- the collector body defines:
  - an interior surface; and
  - an exterior surface separate from the interior surface;
- the TEC defines a chamber interior bounded by the emitter body, the seal, and the interior surface of the collector body;
- the braze material substantially fills the interfacial volume, thereby bonding the insulator to the collector body; and
- the braze material extends beyond the interfacial volume to conformally coat a portion of the exterior surface of the collector body, thereby functioning as a protective coating for the portion of the exterior surface.

2. The TEC of claim 1, wherein:
- the emitter body further comprises:
  - an emitter base bonded to the insulator; and
  - an emitter sidewall that electrically and mechanically connects the emitter face to the emitter base, wherein the emitter surface is electrically coupled to first electrical output via the emitter sidewall;

the emitter body defines a cavity bounded by the emitter face and the emitter sidewall; and the collector face is arranged within the cavity.

3. The TEC of claim 2, wherein:

the collector body further comprises:

a collector base opposing the collector face across the collector body, wherein the collector face is arranged between the collector base and the emitter face; and a collector sidewall that electrically and mechanically connects the collector face to the collector base, wherein the collector surface is electrically coupled to second electrical output via the collector sidewall;

the TEC defines a second gap within the cavity, the second gap defined between the collector sidewall and the emitter sidewall;

the interfacial volume is defined between the insulator and the collector base; and the braze material bonds the insulator to the collector base.

4. The TEC of claim 3, wherein:

the collector body further defines a recess within the chamber interior;

the braze material extends beyond the interfacial volume to conformally coat a portion of the recess; and the braze material does not extend beyond the recess toward the collector face.

5. The TEC of claim 1, wherein a distance between the emitter face and the collector face is less than 10 μm.

6. The TEC of claim 1, wherein the braze material is an active braze alloy (ABA) comprising: a base metal, an active element, and a scale-forming element.

7. The TEC of claim 6, wherein the ABA is selected from the group consisting of: Cu ABA; CuSil ABA; PalNiSi; and an alloy comprising titanium, nickel, and at least one of copper or aluminum.

8. The TEC of claim 1, wherein the chamber interior is fluidly isolated from an ambient environment surrounding the TEC.

9. The TEC of claim 8, wherein:

the first electrical output and the second electrical output are electrically connected across an electrical load;

the chamber interior contains cesium vapor;

the emitter face has a temperature greater than 800° C.; and the emitter face thermionically emits electrons across the gap to the collector face, thereby providing electrical power to the electrical load.

10. The TEC of claim 8, wherein the chamber interior is fluidly coupled to a reservoir containing a work function reduction material.

11. The TEC of claim 1, wherein the braze material conformally coats substantially all of the exterior surface of the collector body.

12. The TEC of claim 11, further comprising a backing arranged outside the chamber interior, wherein:

the backing is electrically insulating;

the collector body is arranged between the emitter body and the backing; and the backing is bonded to the exterior surface of the collector body by the braze material.

13. The TEC of claim 1, further comprising a second portion of braze material that bonds the emitter body to the insulator.

14. A method for fabricating a thermionic energy converter (TEC), the method comprising:

arranging an assembly, comprising:

arranging a first active braze alloy (ABA) portion between an emitter body and an insulator; and arranging a second ABA portion between a collector body and the insulator, wherein the emitter body and the collector body are electrically conductive, wherein the insulator is electrically insulating; and after arranging the assembly, brazing the assembly such that:

the assembly defines a chamber interior bounded by the emitter body, the first ABA portion, the insulator, the second ABA portion, and an interior surface of the collector body;

the first ABA portion substantially fills a first interfacial volume defined between the insulator and the emitter body such that the first interfacial volume does not fluidly couple the chamber interior to an ambient environment surrounding the assembly, thereby mechanically bonding the insulator to the emitter body;

the second ABA portion substantially fills a second interfacial volume defined between the insulator and the collector body such that the second interfacial volume does not fluidly couple the chamber interior to the ambient environment, thereby mechanically bonding the insulator to the collector body;

the second ABA portion extends beyond the second interfacial volume to conformally coat a portion of an exterior surface of the collector body, thereby functioning as a protective coating for the portion of the exterior surface, wherein the exterior surface is separate from the interior surface; and the first ABA portion does not contact the second ABA portion and does not contact the emitter body.

15. The method of claim 14, wherein brazing the assembly comprises:

heating the assembly above a threshold temperature; and after heating the assembly, cooling the assembly below the threshold temperature.

16. The method of claim 15, further comprising, after heating the assembly above the threshold temperature:

hermetically sealing the chamber interior from the ambient environment;

after hermetically sealing the chamber interior, maintaining the assembly within an operating temperature range such that:

the chamber interior contains a cesium vapor; and the emitter body thermionically emits electrons across the chamber interior to the interior surface of the collector body, thereby generating an electrical power output; and while maintaining the assembly within the operating temperature range, providing the electrical power output to an external load.

17. The method of claim 14, wherein the first ABA portion and the second ABA portion have substantially the same composition.

18. The method of claim 14, wherein the second ABA portion comprises a material is selected from the group consisting of: Cu ABA; CuSil ABA; PalNiSi; and an alloy comprising titanium, nickel, and at least one of copper or aluminum.

19. The method of claim 14, wherein:

the collector body further defines:

a recess within the chamber interior;

a first interior section arranged between the interfacial volume and the recess; and a second interior section, wherein the recess is arranged between the first and second interior sections; and after brazing the assembly:

the second ABA portion extends beyond the second interfacial volume to conformally coat the first interior section and a portion of the recess; and the second ABA portion does not extend beyond the recess toward the second interior section.

20. The method of claim 14, wherein, after brazing the assembly, the second ABA portion conformally coats substantially all of the exterior surface of the collector body.

* * * * *